US010356059B2

(12) United States Patent
Perrine et al.

(10) Patent No.: US 10,356,059 B2
(45) Date of Patent: Jul. 16, 2019

(54) METHODS AND SYSTEMS FOR COMMUNICATION-SESSION ARRANGEMENT ON BEHALF OF CRYPTOGRAPHIC ENDPOINTS

(71) Applicant: NAGRAVISION S.A., Cheseaux-sur-Lausanne (CH)

(72) Inventors: Jerome Perrine, Romanel sur Morges (CH); Bernard Benoit, Renens (CH); Maurice Van Riek, Belmont (CH); Osen Karl, Arbaz (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/730,807

(22) Filed: Jun. 4, 2015

(65) Prior Publication Data

US 2016/0359814 A1 Dec. 8, 2016

(51) Int. Cl.
*H04L 29/06* (2006.01)
*H04M 1/60* (2006.01)
(Continued)

(52) U.S. Cl.
CPC ........ *H04L 63/045* (2013.01); *H04L 63/0428* (2013.01); *H04L 63/061* (2013.01);
(Continued)

(58) Field of Classification Search
CPC . H04L 63/045; H04L 63/061; H04L 65/1006; H04L 65/1069; H04L 65/608; H04W 4/008
(Continued)

(56) References Cited

U.S. PATENT DOCUMENTS 5,128,996 A 7/1992 Rosenow
5,150,410 A 9/1992 Bertrand
(Continued)

FOREIGN PATENT DOCUMENTS

CN 1585539 2/2005
CN 1283063 11/2006
(Continued)

OTHER PUBLICATIONS

Notification of Transmittal of the International Search Report and the Written Opinion of the International Searching Authority, or the Declaration, for PCT/EP2016/062375, dated Sep. 8, 2016, 12 pages.
(Continued)

*Primary Examiner* — Oleg Korsak
*Assistant Examiner* — Feliciano S Mejia
(74) *Attorney, Agent, or Firm* — Oblon, McClelland, Maier & Neustadt, L.L.P.

(57) ABSTRACT

In an embodiment, a communication device receives a request to establish a media session with a remote endpoint. In response to receiving the request, the communication device exchanges media-session control data with the remote endpoint on behalf of a local endpoint to establish the requested media session between the local endpoint and the remote endpoint. The communication device is communicatively connected to the local endpoint via a Personal Area Network (PAN) communication link. The communication device relays media-session payload data between the local and remote endpoints. The media-session payload data (i) is associated with the media session and (ii) is encrypted based on at least one payload-data cryptographic key that is not accessible to the communication device.

27 Claims, 6 Drawing Sheets

(51) Int. Cl.
  *H04W 12/02* (2009.01)
  *H04M 1/00* (2006.01)
  *H04W 4/80* (2018.01)
  *H04M 1/253* (2006.01)

(52) U.S. Cl.
  CPC ...... *H04L 65/1006* (2013.01); *H04L 65/1069* (2013.01); *H04L 65/608* (2013.01); *H04M 1/006* (2013.01); *H04M 1/6066* (2013.01); *H04W 4/80* (2018.02); *H04W 12/02* (2013.01); *H04M 1/2535* (2013.01)

(58) Field of Classification Search
  USPC .......................................................... 713/171
  See application file for complete search history.

(56) References Cited

U.S. PATENT DOCUMENTS

| | | |
|---|---|---|
| 5,535,276 A | 7/1996 | Ganesan |
| 5,818,738 A | 10/1998 | Effing |
| 5,825,878 A | 10/1998 | Takahashi |
| 6,373,946 B1 | 4/2002 | Johnston |
| 6,742,116 B1 | 5/2004 | Matsui |
| 6,965,992 B1 | 11/2005 | Joseph |
| 7,024,393 B1 | 4/2006 | Peinado |
| 7,133,521 B2 | 11/2006 | Jabri |
| 7,149,896 B1 | 12/2006 | Bahl |
| 7,167,897 B2 | 1/2007 | Riddle |
| 7,310,730 B1 | 12/2007 | Champagne |
| 7,350,070 B2 * | 3/2008 | Smathers ............ H04L 9/0643 713/150 |
| 7,558,529 B2 | 7/2009 | Seshadri |
| 7,627,289 B2 | 12/2009 | Huddart |
| 7,680,273 B2 | 3/2010 | Whitehead |
| 7,734,802 B1 | 6/2010 | Gay |
| 7,869,594 B2 | 1/2011 | Tsurumoto |
| 8,078,787 B2 * | 12/2011 | Lydon .................. G06F 13/387 710/105 |
| 8,103,210 B2 | 1/2012 | Tamura |
| 8,200,959 B2 * | 6/2012 | Wing .................... H04L 63/126 340/425.5 |
| 8,228,861 B1 * | 7/2012 | Nix ....................... H04W 36/00 370/329 |
| 8,379,921 B1 | 2/2013 | Golan |
| 8,477,661 B2 | 7/2013 | Saleem |
| 8,738,916 B2 | 5/2014 | Klassen |
| 8,761,184 B1 | 6/2014 | Ho |
| 8,862,129 B2 | 10/2014 | Moshir |
| 9,369,445 B2 * | 6/2016 | Mahajan ............. H04L 63/0428 |
| 9,569,638 B2 * | 2/2017 | Zatko .................... G06F 21/71 |
| 10,177,933 B2 * | 1/2019 | Burks ................... G08C 17/02 |
| 2002/0002683 A1 | 1/2002 | Benson |
| 2002/0058515 A1 | 5/2002 | Holler |
| 2002/0093948 A1 | 7/2002 | Dertz |
| 2002/0098878 A1 | 7/2002 | Mooney |
| 2002/0122401 A1 | 9/2002 | Xiang |
| 2003/0018705 A1 | 1/2003 | Chen |
| 2003/0046539 A1 | 3/2003 | Negawa |
| 2003/0059005 A1 | 3/2003 | Meyerson |
| 2003/0088618 A1 | 5/2003 | Sueyoshi |
| 2003/0235308 A1 | 12/2003 | Boynton |
| 2004/0109409 A1 | 6/2004 | Simpson |
| 2005/0073575 A1 | 4/2005 | Thacher |
| 2005/0154793 A1 | 7/2005 | Khartabil |
| 2005/0154973 A1 | 7/2005 | Otsuka |
| 2005/0198379 A1 | 9/2005 | Panasyuk |
| 2005/0198380 A1 | 9/2005 | Panasyuk |
| 2005/0273510 A1 | 12/2005 | Schuh |
| 2006/0050883 A1 | 3/2006 | Walker |
| 2006/0101288 A1 | 5/2006 | Smeets |
| 2006/0165060 A1 * | 7/2006 | Dua ....................... G06Q 20/20 370/352 |
| 2006/0198520 A1 | 9/2006 | Courtney |
| 2007/0018334 A1 | 1/2007 | Peytavy |
| 2007/0047711 A1 | 3/2007 | Florkey |
| 2007/0263798 A1 | 11/2007 | Dewing |
| 2007/0294346 A1 | 12/2007 | Moore |
| 2008/0010674 A1 | 1/2008 | Lee |
| 2008/0034421 A1 | 2/2008 | Ahn |
| 2008/0037447 A1 | 2/2008 | Garg |
| 2008/0046731 A1 | 2/2008 | Wu |
| 2008/0130894 A1 | 6/2008 | Qj |
| 2008/0146290 A1 | 6/2008 | Sreeram |
| 2008/0165707 A1 | 7/2008 | Baird |
| 2008/0171579 A1 | 7/2008 | Grubek |
| 2008/0263363 A1 | 10/2008 | Jueneman |
| 2009/0097628 A1 | 4/2009 | Yap |
| 2009/0147958 A1 | 6/2009 | Calcaterra |
| 2009/0150668 A1 | 6/2009 | Liu |
| 2009/0168978 A1 | 7/2009 | Laws |
| 2009/0296932 A1 | 12/2009 | Pilavic |
| 2010/0217982 A1 | 8/2010 | Brown |
| 2011/0047383 A1 | 2/2011 | Klassen |
| 2011/0150216 A1 | 6/2011 | Barry |
| 2011/0251899 A1 | 10/2011 | Proulx |
| 2012/0005475 A1 | 1/2012 | Inagaki |
| 2012/0198531 A1 | 8/2012 | Ort |
| 2012/0204029 A1 | 8/2012 | Trabucco |
| 2012/0252531 A1 | 10/2012 | King |
| 2012/0257750 A1 | 10/2012 | Bohm |
| 2012/0258726 A1 | 10/2012 | Bansal |
| 2012/0291095 A1 | 11/2012 | Narendra |
| 2013/0170361 A1 | 7/2013 | Manyakin |
| 2013/0252583 A1 | 9/2013 | Brown |
| 2013/0273889 A1 | 10/2013 | Lobmaier |
| 2013/0336161 A1 | 12/2013 | Jung |
| 2013/0339754 A1 | 12/2013 | Takashima |
| 2014/0033279 A1 | 1/2014 | Nimashakavi |
| 2014/0033280 A1 | 1/2014 | Nimashakavi |
| 2014/0280982 A1 | 9/2014 | Patel |
| 2014/0301249 A1 | 10/2014 | Moss |
| 2015/0031288 A1 * | 1/2015 | Tubbesing ............ H04W 4/008 455/41.1 |
| 2015/0059251 A1 | 3/2015 | Rinner |
| 2015/0089569 A1 | 3/2015 | Sondhi |
| 2015/0222601 A1 * | 8/2015 | Metz ....................... H04L 63/04 726/9 |
| 2015/0237019 A1 | 8/2015 | Rohloff |
| 2015/0365400 A1 | 12/2015 | Cox |
| 2016/0028696 A1 | 1/2016 | Howe |
| 2016/0234356 A1 | 8/2016 | Thomas |

FOREIGN PATENT DOCUMENTS

| | | |
|---|---|---|
| CN | 101340433 | 7/2009 |
| EP | 1863301 | 2/2010 |
| EP | 2175580 | 4/2010 |
| EP | 2262143 | 12/2010 |
| GB | 2388279 | 11/2003 |
| GB | 2420251 | 5/2006 |
| WO | 2008129546 | 10/2008 |
| WO | 2012024903 | 3/2012 |
| WO | 2013121275 | 8/2013 |

OTHER PUBLICATIONS

Petersen, M., "Voice and Data Encryption Module for Attachment to Portable Cellular Telephone", Motorola Technical Developments, Motorola Inc., Schaumburg, IL, US, vol. 38, Jun. 1, 1991, pp. 32-34 XP000906022, ISSN: 0887-5286.
Chumchu, P., et al., "A simple and Cheap End-to-End Voice Encryption Framework over GSM-based networks", Computing, Communications and Applications Conference (Comcomap), 2012, IEEE, Jan. 11, 2012, XP032117819, DOI: 10.1109/COMCOMAP. 2012.6154800, ISBN: 978-1-4577-1717-8.
Jabra Product Guide. 2009.
Lefebvre, R., Set Incoming Calls to Headset or Speaker on Your iPhone With iOS 7 Beata [iOS Tips]:, Jul. 2013, found on www.cultofmac.com.
Menezes, et al. Handbook of Applied Cryptography, 1996, XP001525001.

(56) References Cited

OTHER PUBLICATIONS

Notification of Transmittal of the International Search Report and The Written Opinion of the International Searching Authority, or the Declaration, for PCT/EP2016/061975, dated Jul. 1, 2016, 11 pages.
Menezes, et al., "Handbook of Applied Cryptography", 1997, ISBN: 0848385237.
International Search Report and Written Opinion for PCT/EP2016/061966 dated Aug. 19, 2016, 10 pages.
International Search Report and Written Opinion for PCT/EP2016/062578 dated Aug. 4, 2016, 8 pages.
Reference Manual and operating Instructions Nagra Seven. Nagra. Mar. 2014.
CN 105025404. Google English Translation. Apr. 21, 2014.
CN 101227279 v. Google English Translation. Jul. 23, 2008.
European Office Action dated Jan. 22, 2019 in Patent Application No. 16 726 595.8, 5 pages.

\* cited by examiner

METHODS AND SYSTEMS FOR COMMUNICATION-SESSION ARRANGEMENT ON BEHALF OF CRYPTOGRAPHIC ENDPOINTS

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld (as may be the case for a walkie-talkie), body-mounted, or attached to a vehicle (such as the roof of a car), as examples.

Given the relative ease with which radio signals can be intercepted, communication with (or between) personal mobile devices is often encrypted to prevent interception of the communication by third parties. Encryption is the process of converting audible voice or other data into unintelligible voice, while decryption is the process of converting the unintelligible voice back to the original audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

OVERVIEW

Described herein are methods and systems for communication-session arrangement on behalf of cryptographic endpoints. At least one embodiment takes the form of a method: A communication device receives a request to establish a media session with a remote endpoint. In response to receiving the request, the communication device exchanges media-session control data with the remote endpoint on behalf of a local endpoint to establish the requested media session between the local endpoint and the remote endpoint. The communication device is communicatively connected to the local endpoint via a Personal Area Network (PAN) communication link. The communication device relays media-session payload data between the local and remote endpoints. The media-session payload data (i) is associated with the media session and (ii) is encrypted based on at least one payload-data cryptographic key that is not accessible to the communication device.

At least one embodiment the form of a communication device that includes a communication interface, processor, and data storage containing instructions executable by the processor for causing the communication device to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, exchanging the media-session control data takes the form of (or includes) receiving the media-session control data from the remote endpoint.

In at least one embodiment, the media-session control data includes metadata associated with the media session.

In at least one embodiment, the media-session control data includes a second cryptographic key.

In at least one such embodiment, the second cryptographic key takes the form of (or includes) a public key that is associated with a private key. In at least one such embodiment, the private key is associated with the remote endpoint.

In at least one other such embodiment, the payload-data cryptographic key is based on the second cryptographic key.

In at least one embodiment, the media-session control data includes media-session key-exchange data.

In at least one embodiment, the media-session control data includes a digital signature.

In at least one such embodiment, the digital signature takes the form of (or includes) a digital signature generated by the remote endpoint based on a private key that is associated with the remote endpoint.

In at least one other such embodiment, the digital signature takes the form of (or includes) a digital signature generated by a trusted third party.

In at least one other such embodiment, the received media-session control data further includes a second cryptographic key. The digital signature is based on the second cryptographic key. In at least one such embodiment, the digital signature takes the form of (or includes) a digital signature generated by a trusted third party based on the second cryptographic key.

In at least one embodiment, the media-session control data takes the form of (or includes) Session Initial Protocol (SIP) data. In at least one embodiment, the media-session control data takes the form of (or includes) ZRTP data. In at least one embodiment, the media-session control data takes the form of (or includes) Secure Real-time Transport Protocol (SRTP) data. In at least one embodiment, the media-session control data takes the form of (or includes) Session Description Protocol (SDP) data.

In at least one embodiment, relaying the media-session payload data includes relaying media-session payload data that includes both the media-session payload data and a digital signature that is based on the media-session payload data. In at least one such embodiment, the digital signature takes the form of (or includes) a digital signature generated by the remote endpoint based on the media-session payload data.

In at least one embodiment, the PAN communication link takes the form of a Bluetooth communication link.

In at least one such embodiment, relaying the media-session payload data takes the form of (or includes) relaying the media-session payload data between the local endpoint and the communication device via the Bluetooth communication link according to a first Bluetooth profile.

In at least one such embodiment, the first Bluetooth profile takes the form of (or includes) a Serial Port Profile (SPP).

In at least one other such embodiment, the communication device providing local-endpoint media-session control data to the local endpoint via the Bluetooth communication link according to a second Bluetooth profile that is different from the first Bluetooth profile. The local-endpoint media-session control data is based on the media-session control data. In at least one such embodiment, the second Bluetooth profile takes the form of (or includes) an Advanced Audio Distribution Profile (A2DP).

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

Various example embodiments are described herein with reference to the following drawings, in which like numerals denote like entities, and in which.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
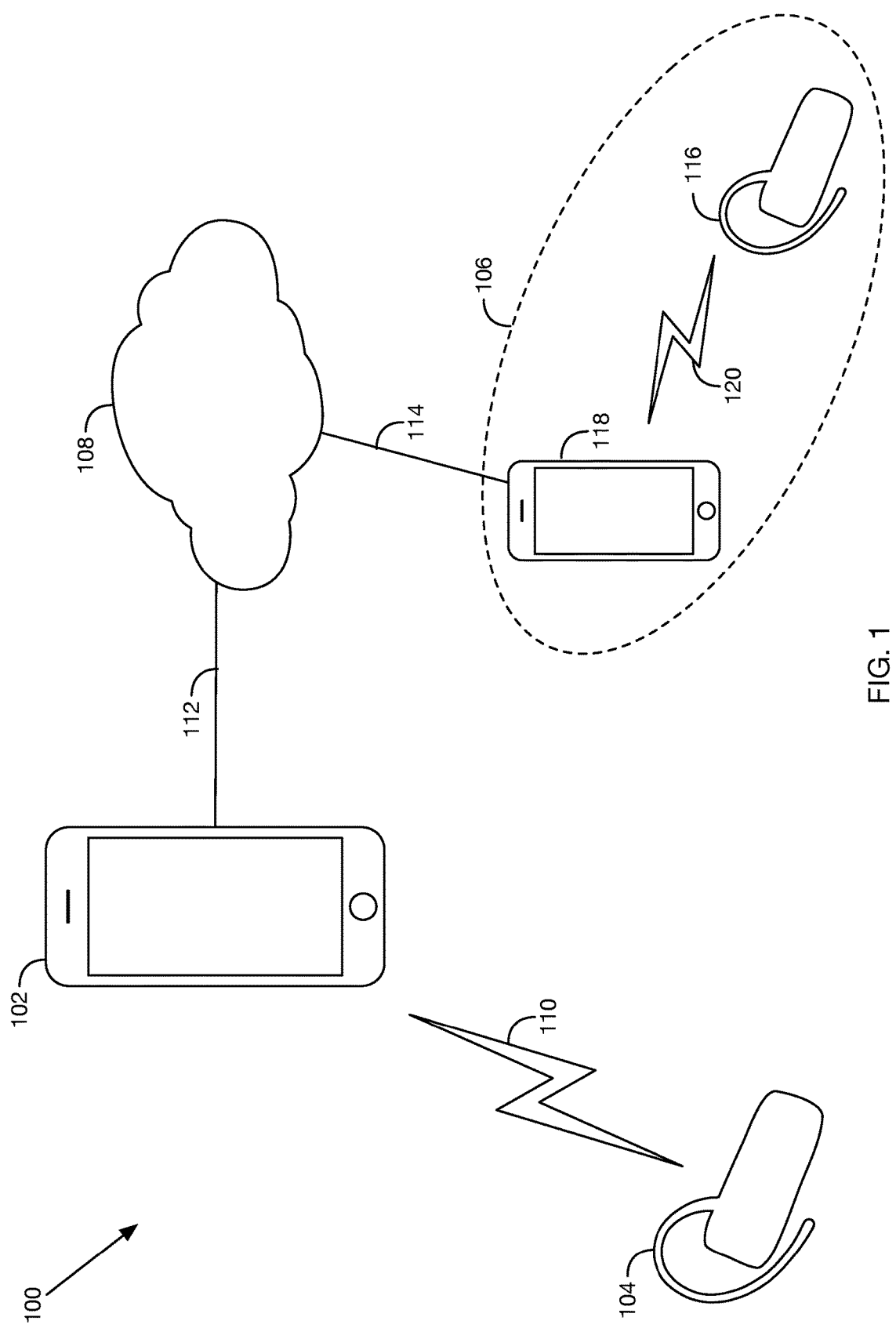
FIG. 1 depicts a communication system, in accordance with at least one embodiment.

FIG. 1 depicts a communication system, in accordance with at least one embodiment. As shown, a communication system 100 includes a communication device 102, a local endpoint 104, and a remote endpoint 106.

Communication device 102 could take the form of, for example, a personal computer, a desktop computer, a laptop computer, a notebook computer, a tablet computer, a handheld computer, a wearable computer, a personal digital assistant (PDA), a feature phone, an optical head-mounted display (OHMD), and/or a smart watch, among numerous other possibilities that will be known to those of skill in the art. In the embodiment illustrated in FIG. 1, communication device 102 takes the form of a smartphone.

Local endpoint 104 could take the form of a headset (such as a Bluetooth headset), a communication-device-mounted accessory (such as a case or sleeve), and/or any other entity capable of carrying out the local-endpoint functions described herein.

As shown in FIG. 1, communication device 102 is communicatively connected to local endpoint 104 via a Personal Area Network (PAN) communication link 110. In an embodiment, the PAN communication link takes the form of a Bluetooth communication link, though the link could take other forms as well.

Remote endpoint 106 may be any suitable device (or combination of devices) configured to perform the remote-endpoint functions described herein. In the embodiment illustrated in FIG. 1, remote endpoint 106 takes the form of a remote-endpoint communication device 118 and a remote-endpoint accessory 116 that are communicatively connected via a communication link 120. Accessory 116, device 118, and communication link 120 may be similar in function and/or structure to local endpoint 104, communication device 102, and Personal Area Network (PAN) communication link 110 (respectively), as examples. In other configurations, remote endpoint 106 could take the form of a cryptographic phone, a private branch exchange (PBX), an Internet protocol PBX (IP-PBX), and/or any other entity capable of carrying out the described remote-endpoint functions.

Figure 2:
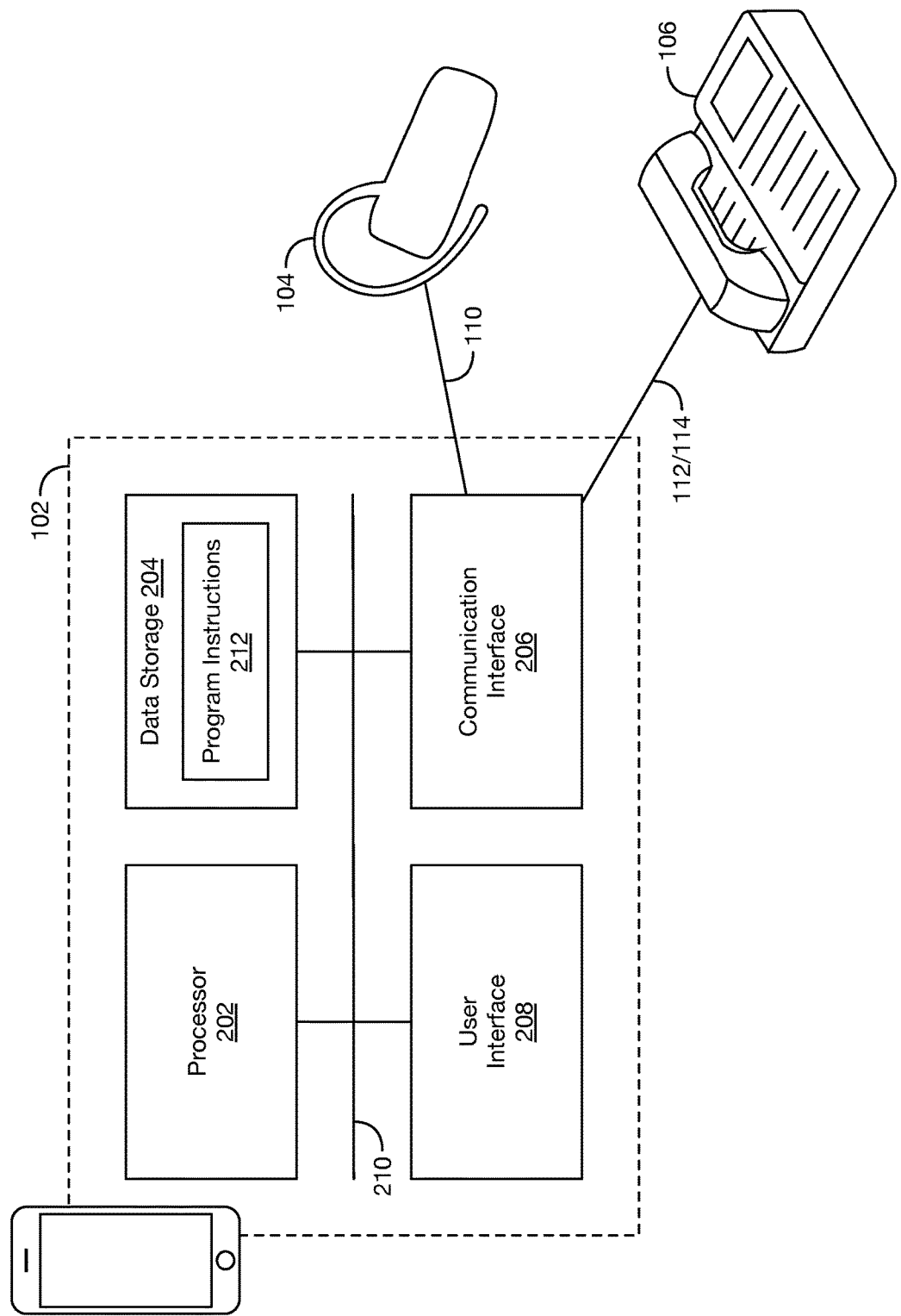
FIG. 2 depicts a block diagram of a communication device, in accordance with at least one embodiment.

FIG. 2 depicts a block diagram of a communication device, in accordance with at least one embodiment. As shown, communication device 102 includes a processor 202, data storage 204, a communication interface 206, and a user interface 208, each of which is interconnected via a system bus 210. In the embodiment illustrated in FIG. 1, remote endpoint 106 takes the form of a cryptographic desk phone. Those having skill in the relevant art will appreciate that communication device 102 could have additional and/or different components, and perhaps a different arrangement of components, among many other possible variations that could be listed here.

Processor 202 may include one or more processors of any type deemed suitable by those of skill in the relevant art, some examples including a microprocessor, an application-specific integrated circuit (ASIC), and a digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used.

As depicted in FIG. 2, data storage 204 contains program instructions 210 executable by processor 202 for carrying out various functions, though data storage 204 may contain different and/or additional data. In an embodiment in which communication device 102 is configured to carry out one or more processes and/or functions (such as the processes and functions described with reference to FIG. 1), program instructions 210 are executable by processor 202 for carrying out those functions. In instances where other entities described herein have a structure similar to that of communication device 102 as described in connection with at least FIG. 3, the respective program instructions 210 stored by the respective data storages 204 of those respective devices are executable by their respective processors 202 to carry out functions performed by those devices.

Communication interface 206 may include any necessary hardware (e.g., chipsets, antennas, Ethernet cards, etc.) and/or software for conducting one or more forms of communication with one or more other components and/or entities (such as local endpoint 104 and remote endpoint 106, as examples). Communication interface 206 may be configured to communicate according to one or more protocols such as Bluetooth, NFC, Infrared Data Association (IrDA), ZigBee, Wi-Fi, Universal Serial Bus (USB), IEEE 1394 (FireWire), and/or IEEE 802.3 (Ethernet)), as examples.

User interface 208 may include one or more displays, touchscreens, loudspeakers, microphones, dial keys, buttons, switches, light emitting diodes (LEDs), and the like.

One or more user-interface components (e.g., an interactive touchscreen-and-display component) could provide both user-input and user-output functionality. And other user-interface components could be implemented in a given context, as known to those of skill in the art.

Figure 3:
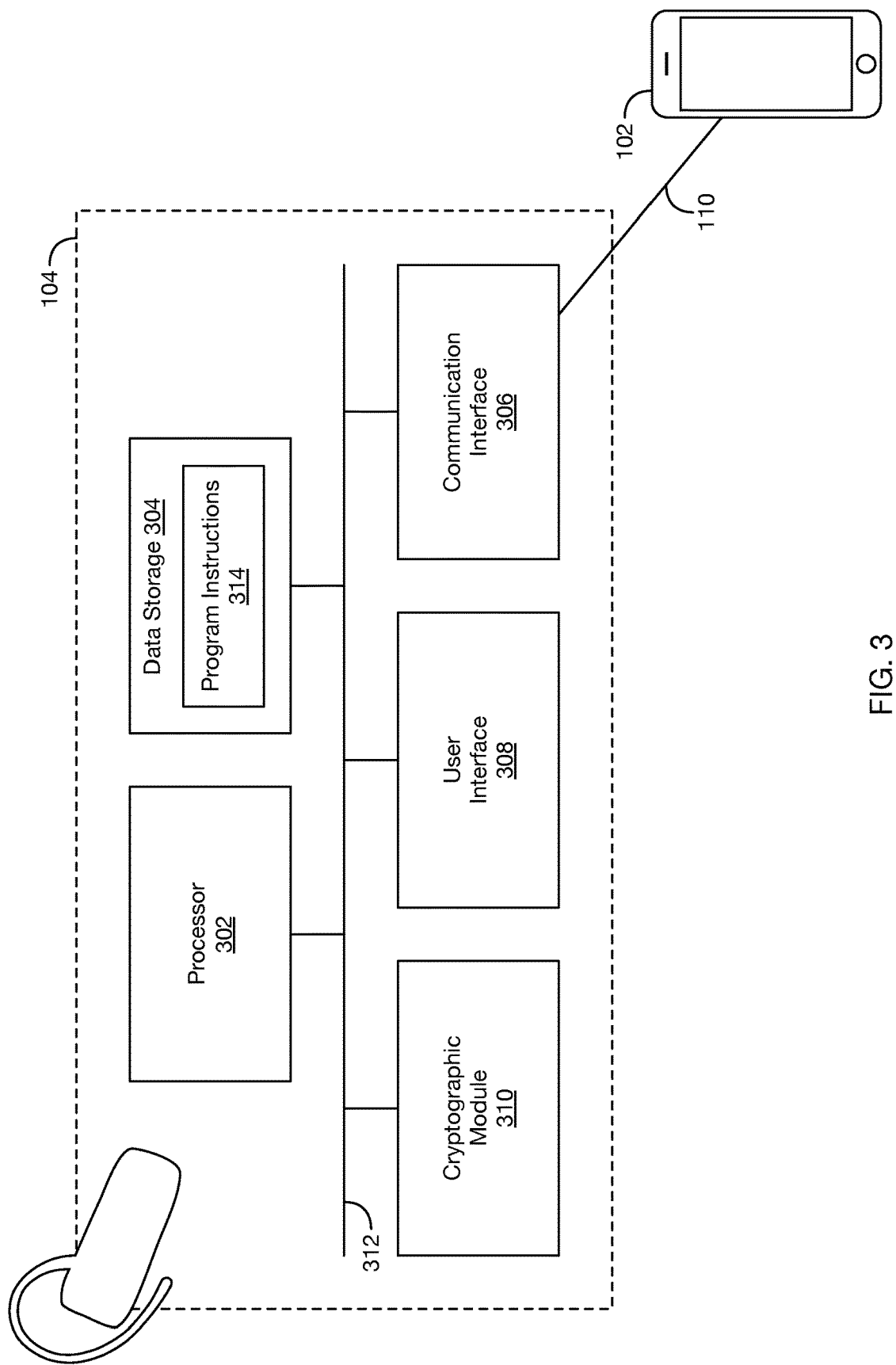
FIG. 3 depicts a block diagram of a local endpoint, in accordance with at least one embodiment.

FIG. 3 depicts a block diagram of a local endpoint, in accordance with at least one embodiment. As shown, local endpoint 104 includes a processor 302, data storage 304, a PAN communication interface 306, a user interface 308, and a cryptographic module 310, each of which is interconnected via a system bus 312. Those having skill in the relevant art will appreciate that local endpoint 104 could have additional and/or different components, and perhaps a different arrangement of components, among many other possible variations that could be listed here. Processor 302, data storage 304, PAN communication interface 306, and/or user interface 308 may function in a manner similar to the similarly-named entities of communication device 102, as described (for example) with respect to FIG. 2 above.

Cryptographic module 310 may include hardware and/or software for performing cryptographic functions or processes—e.g., encryption, decryption, signature generation, signature verification, and/or key generation. In an embodiment, cryptographic module 310 is contained within an explicitly defined perimeter that establishes the physical bounds of the cryptographic module and that contains any processors and/or other hardware components that store and protect any software and firmware components of the cryptographic module. Cryptographic module 310 could take the form of (or include) a secure crypto-processor, a smart card, a secure digital (SD) card, a micro SD card, a subscriber identity module (SIM) card, and/or any other cryptographic module, as known to one of skill in the art.

Figure 4:
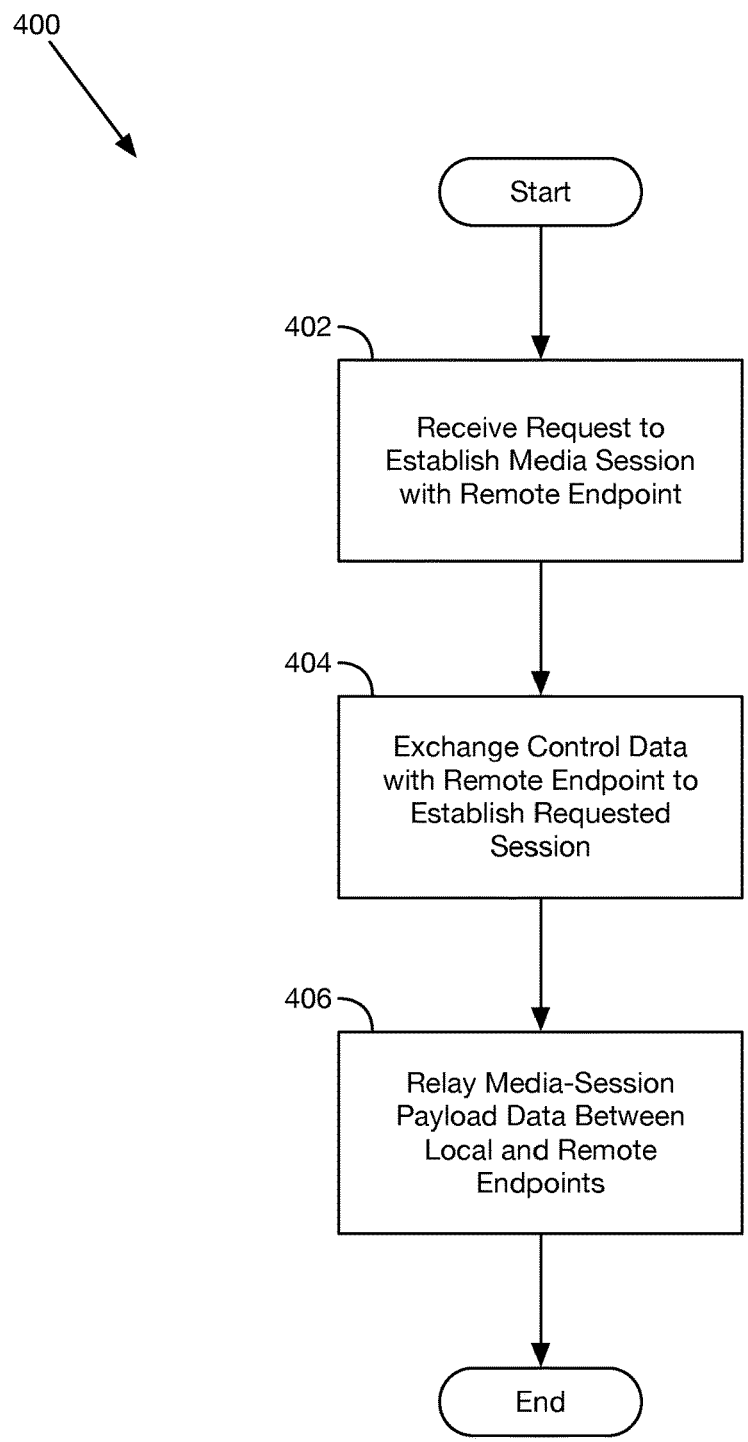
FIG. 4 depicts a flowchart of a method, in accordance with at least one embodiment.

FIG. 4 depicts a flowchart of a method, in accordance with at least one embodiment. As shown, method 400 begins at step 402 with communication device 102 receiving a request to establish a media session with remote endpoint 106. The media session could take the form of (or include) a telephone call and/or a video conference, among other possibilities.

Communication device 102 may receive the request via user interface 208. For example, communication device 102 may receive the request as a result of a user navigating a set of one or more contacts via user interface 208 and then selecting a contact (or perhaps multiple contacts) with whom the user would like to establish a media session.

Additionally or alternatively, communication device 102 may receive the request from local endpoint 104. For example, communication device 102 may receive the request as an audio signal representing a spoken command such as "call John." As another example, communication device 102 could receive the request as a Bluetooth command instructing communication device 102 to establish a media session with a given contact (e.g., a contact highlighted via user interface 208 of communication device 102).

As another possibility, communication device 102 may receive the request from remote endpoint 106. The request could take the form of a call-origination message, a Session Initiation Protocol (SIP) message, a Real-time Transport Protocol (RTP) message, a Secure RTP (SRTP) message, a ZRTP message, a Session Description Protocol (SDP) message, an H.323 message, an Inter-Asterisk eXchange (IAX) message, and/or an IAX2 message, among many other possibilities that will be apparent to those of skill in the art.

Those of skill in the art will appreciate that communication device 102 may receive the request in other ways as well, including any combination of the above-provided examples. For example, communication device 102 could receive a SIP message from local endpoint 104 via a Bluetooth connection. The request could take other forms as well.

At step 404, communication device 102, in response to receiving the request, exchanges media-session control data with remote endpoint 106 on behalf of local endpoint 104 to establish the requested media session between local endpoint 104 and remote endpoint 106. Exchanging the media-session control data could include receiving the media-session control data from remote endpoint 106 and/or sending the media-session control data to remote endpoint 106, as examples. The media-session control data could take the form of (or include) SIP data, RTP data, SRTP data, ZRTP data, SDP data, H.323 data, IAX data, and/or IAX2 data, among many other possibilities that will be apparent to those of skill in the art.

Figure 5:
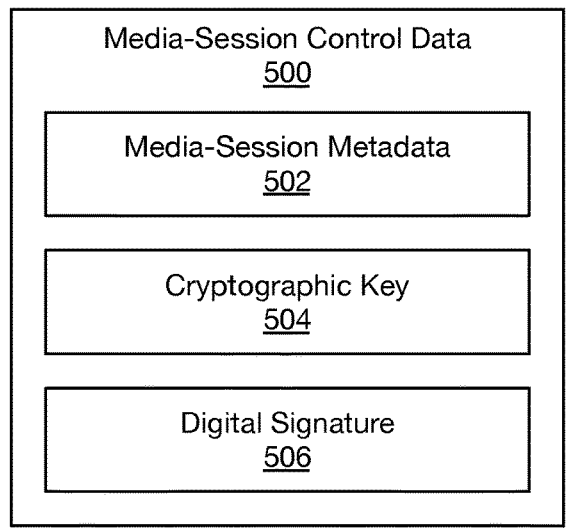
FIG. 5 depicts media-session control data, in accordance with at least one embodiment.

FIG. 5 depicts media-session control data, in accordance with at least one embodiment. As shown, media-session control data 500 includes metadata 502, a cryptographic key 504, and a digital signature 506.

In at least one embodiment, metadata 502 takes the form of (or includes) metadata associated with the requested media session. For example, if communication device 102 receives the request from remote endpoint 106 as a SIP message that includes a SIP-message identifier, then metadata 502 could include the SIP-message identifier. As another example, metadata 502 could include a source identifier and/or destination identifier such as a telephone number, an Internet protocol (IP) address, and/or a uniform resource identifier (URI). Metadata 502 could take other forms as well.

Cryptographic key 504 could take the form of (or include) a public key that is associated with a private key. The public and/or private keys could take the form of respective RSA keys, among other possibilities that will be known to those in the art. Either or both of the private key and the public key may be associated with remote endpoint 106. For example, remote endpoint 106 may have generated both the public key and the private key. As another example, remote endpoint 106 may store the private key—e.g., in a cryptographic module similar to cryptographic module 310.

Instead of (or in addition to) cryptographic key 504, media-session control data 500 could include media-session key-exchange data. The key-exchange data could take the form of (or include) components of a Diffie-Hellman key exchange, which could be used by local endpoint 104 and/or remote endpoint 106 to establish a shared cryptographic key. The key-exchange data could take other forms as well.

Digital signature 506 could take the form of (or include) a digital signature generated by remote endpoint 106 based on a private key that is associated with the remote endpoint. For example, the digital signature may be a signature generated based on a cryptographic hash of metadata 502 (and/or other data in media-session control data 500) and further based on a private key stored in a cryptographic module of remote endpoint 106. The private key could further be stored in cryptographic module 310 of local endpoint 104 (e.g., if digital signature 506 takes the form of a message authentication code).

Additionally or alternatively, digital signature 506 could take the form of (or include) a digital signature generated by a trusted third party such as a centralized certificate authority and/or a decentralized key-signing party (e.g., as in a web-of-trust authentication model). In an embodiment where media-session control data 500 includes both cryptographic key 504 and digital signature 506, the digital signature may be based on the cryptographic key and may be generated by the trusted third party based on the cryptographic key.

It will be understood by those of skill in the art that media-session control data 500 may include different and/or additional data. For example, in some embodiments, media-session control data 500 may not include cryptographic key 504 or digital signature 506. Other variations are possible as well.

At step 406, communication device 102 relays media-session payload data between local endpoint 104 and remote endpoint 106. The media-session payload data (i) is associated with the media session and (ii) is encrypted based on at least one payload-data cryptographic key that is not accessible to communication device 102. In an embodiment, the payload-data cryptographic key takes the form of a key stored in cryptographic module 310 of local endpoint 104, and could be a symmetric key (perhaps established using a Diffie-Hellman key exchange between local endpoint 104 and remote endpoint 106) and/or a private key that is part of an asymmetric key pair, as examples. In another embodiment, the payload-data cryptographic key takes the form of a key stored in a cryptographic module of remote endpoint 106 and could be a symmetric key and/or a public key that is associated with a private key (e.g., a private key stored in cryptographic module 310 of local endpoint 104).

In an embodiment, relaying the media-session payload data includes relaying media-session transport data that includes the media-session payload data, possibly in addition to other data.

Figure 6:
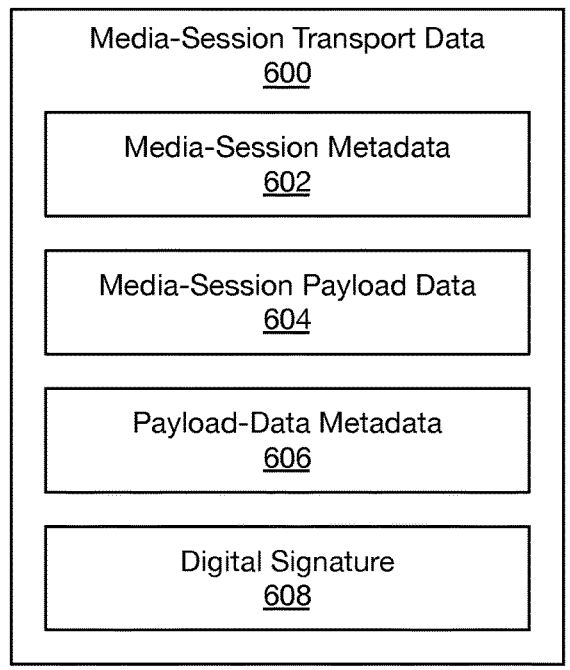
FIG. 6 depicts media-session transport data, in accordance with at least one embodiment.
Figure 7:
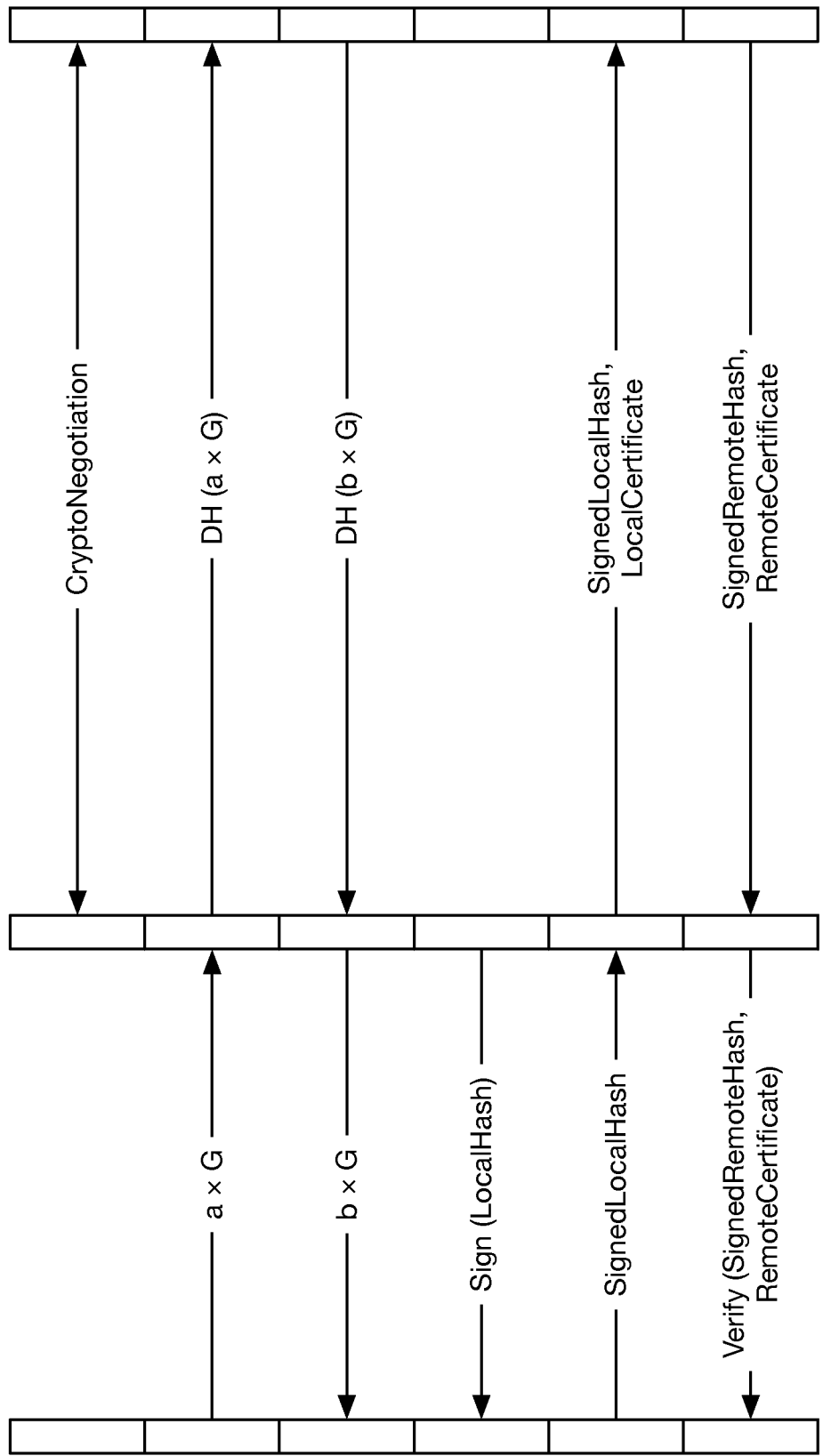

FIG. 6 depicts media-session transport data, in accordance with at least one embodiment. As shown in FIG. 6, media-session transport data 600 includes media-session metadata 602, media-session payload data 604, payload-data metadata 606, and a digital signature 608.

Media-session metadata 602 could take the form of (or include) metadata associated with the requested media session. In some embodiments, media-session metadata take a form similar to that of metadata 502 associated with the requested media session. In an embodiment, media-session metadata 602 identifies media-session payload data 604 as being associated with the media session.

Payload-data metadata 606 could take the form of (or include) metadata associated with media-session payload data 604. For example, metadata 606 could identify a given cryptographic key that was used to encrypt media-session payload data 604 and/or that may be used to decrypt media-session payload data 604. Metadata 606 could identify a codec (e.g., an audio codec and/or a video codec) used to encode the media represented by media-session payload data 604. Metadata 606 could include timing data and/or ordering data for respective media-session payloads of data such as media-session payload data 604. Metadata 606 could take other forms as well.

Digital signature 608 may be based on media-session payload data 604. To simplify generation and verification of digital signature 608, the digital signature may be based on a hash (e.g., a cryptographic hash) of the media-session payload data. The hash may be generated using a hash function such as SHA-1 and/or MD5, as examples. Digital signature 608 may be generated by remote endpoint 106 based on media-session payload data 604.

Relaying media-session payload data 604 may include relaying the media-session payload data between communication device 102 and local endpoint 104 via PAN communication link 110. In an embodiment, PAN communication link 110 takes the form of a Bluetooth communication link, and relaying media-session payload data 604 between communication device 102 and local endpoint 104 via the PAN communication link takes the form of (or includes) relaying the media-session payload data via the Bluetooth communication link.

Relaying media-session payload data 604 via the Bluetooth communication link may include relaying the media-session payload data according to a first Bluetooth profile. The first Bluetooth profile could take the form of (or include) an Advanced Audio Distribution Profile (A2DP) and/or a Bluetooth audio profile, as examples. The media-session payload data 604 may be passed to local endpoint 104 via the Bluetooth audio profile without communication device 102 altering the media-session payload data. By relaying the media-session payload data according to a Bluetooth audio profile, modifications to a generic Bluetooth for enabling secure communication may be minimal.

Communication device 102 may provide local-endpoint media-session control data to local endpoint 104 via the PAN communication link. The local-endpoint media-session control may be based on the media-session control data, for example, and could include a cryptographic key (e.g., a public key), a digital signature (e.g., of a cryptographic key and/or of media-session payload data), media-session metadata, and/or payload-data metadata, among other possibilities. Such local-endpoint media-session control data may be used to by local endpoint 104 for encrypting and/or decrypting media-session payload data 604, for example.

In an embodiment, PAN communication link 110 takes the form of a Bluetooth communication link and providing local-endpoint media-session control data to local endpoint 104 via the PAN communication link takes the form of providing the local-endpoint media-session control data via the Bluetooth communication link. Providing the local-endpoint media-session control data via the Bluetooth communication link could include providing the local-endpoint media-session control data according to a second Bluetooth profile that is different from the first Bluetooth profile. The second Bluetooth profile could take the form of (or include) a Serial Port Profile (SPP) and/or a non-audio Bluetooth profile, as examples.

Although features and elements are described above in particular combinations, those having ordinary skill in the art will appreciate that each feature or element can be used alone or in any combination with the other features and elements without departing from the scope and spirit of the present disclosure.

The invention claimed is:

1. A method comprising:
receiving, at a communication device from an accessory, a request to establish an audio-based encrypted media session between the accessory and a remote device wherein,
(i) the accessory to the communication device is a first cryptographic endpoint of the requested audio-based encrypted media session, and
(ii) the remote device is a second cryptographic endpoint of the requested audio-based encrypted media session,
wherein the communication device is communicatively connected to a remote device as a second cryptographic endpoint of the requested audio-based encrypted audio-based media session, wherein the communication device is communicatively connected to,
(i) the accessory via a Personal Area Network (PAN) communication link, and (ii) the remote device via a communication link separate from the PAN communication link;

in response to receiving the request, the communication device exchanging control data with the remote device on behalf of the accessory to establish the requested encrypted media session between the accessory and the remote device;

during the established encrypted audio based media session, the communication device relaying, (i) inbound encrypted-media-session payload data from the remote device to the accessory, the inbound encrypted-media-session payload data being encrypted such that decryption of the inbound encrypted-media-session payload data requires a first payload-data cryptographic key that is accessible to the accessory and that is not accessible to the communication device, and (ii) outbound encrypted-media-session payload data from the accessory to the remote device, the outbound encrypted-media-session payload data being encrypted such that decryption of the outbound encrypted-media-session payload data requires a second payload-data cryptographic key that is accessible to the remote device and that is not accessible to the communication device.

2. The method of claim 1, wherein exchanging control data comprises receiving control data from the remote device.

3. The method of claim 1, wherein the control data comprises metadata associated with the requested audio-based encrypted media session.

4. The method of claim 1, wherein the control data comprises a public cryptographic key that is associated with the first payload-data cryptographic key.

5. The method of claim 1, wherein the control data comprises a public cryptographic key that is associated with the second payload-data cryptographic key.

6. The method of claim 1, wherein the control data comprises key-exchange data.

7. , The method of claim 6, wherein the key-exchange data comprises components of a Diffie-Hellman key exchange, based on which the first payload-data cryptographic key and the second payload-data are established as a shared cryptographic key between the accessory and the remote device.

8. The method of claim 1, wherein the control data comprises a digital signature.

9. The method of claim 8, wherein the digital signature comprises a digital signature generated by the remote device based on a private cryptographic key that is associated with the remote device.

10. The method of claim 8, wherein the digital signature comprises a digital signature generated by a trusted third party.

11. The method of claim 8, wherein the control data further comprises a public cryptographic key, wherein the digital signature is based on the public cryptographic key.

12. The method of claim 11, wherein the digital signature comprises a digital signature generated by a trusted third party based on the public cryptographic key.

13. The method of claim 1, wherein the control data comprises Session Initial Protocol (SIP) data.

14. The method of claim 1, wherein the control data comprises ZRTP data.

15. The method of claim 1, wherein the control data comprises Secure Real-time Transport Protocol (SRTP) data.

16. The method of claim 1, wherein the control data comprises Session Description Protocol (SDP) data.

17. The method of claim 1, wherein relaying the inbound encrypted-media-session audio payload data comprises relaying media-session audio payload data that includes both the inbound encrypted-media-session audio payload data and a digital signature that is based on the inbound encrypted-media-session audio, payload data.

18. The method of claim 17, wherein the digital signature comprises a digital signature generated by the remote device based on the inbound encrypted-media-session audio payload data.

19. The method of claim 1, wherein the PAN communication link comprises a Bluetooth communication link.

20. The method of claim 1, wherein the accessory is a headset.

21. The method of claim 1, wherein the first payload-data cryptographic key and the second payload-data cryptographic key are symmetric keys.

22. The method of claim 1, wherein the first payload-data cryptographic key is part of a first asymmetric key pair and the second payload-data cryptographic key is part of a second asymmetric key pair.

23. The method as claimed in claim 1, wherein the audio-based encrypted media session comprises an encrypted video conference session.

24. The method as claimed in claim 1, wherein the communication device comprises a phone.

25. The method as claimed in claim 1, wherein the communication device comprises a handheld computer.

26. The method of claim 24, wherein the PAN communication link comprises a Bluetooth communication link.

27. A communication device comprising:
a Personal Area Network (PAN) communication link:
a communication interface link separate from the PAN communication link;
a processor; and
data storage containing instructions executable by the processor for causing the communication device to carry out a set of functions, the set of functions comprising:
receiving, via the communication link, a request to establish an audio-based encrypted media session between
(i) an accessory to the communication device as a first cryptographic endpoint of the encrypted audio-based media session and
(ii) a remote device as a second cryptographic endpoint of the encrypted audio-based media session
in response to the communication device receiving the request, exchanging, via the communication link, control data with the remote device on behalf of the accessory to establish the requested encrypted audio-based media session between the accessory' and the remote device; and
during the established encrypted audio-based media session, relaying
(i) inbound encrypted-media-session audio payload data from the remote device to the accessory', the inbound encrypted-media-session audio payload data being encrypted such that decryption of the inbound encrypted-media-session audio payload data requires a first payload-data cryptographic key that is accessible to the accessory and is not accessible to the communication device and
(ii) outbound encrypted-media-session audio payload data from the accessory to the remote device, the outbound encrypted-media-session audio payload data being encrypted such that decryption of the outbound encrypted-media-session audio payload data requires a second payload-data cryptographic key that is accessible to the remote device and is not accessible to the communication device.

* * * * *